INVENTORS
WILLIAM H. BENNERT
ERNEST C. BAILEY
PAUL A. MARTIN

BY Mandeville & Schweitzer
ATTORNEYS

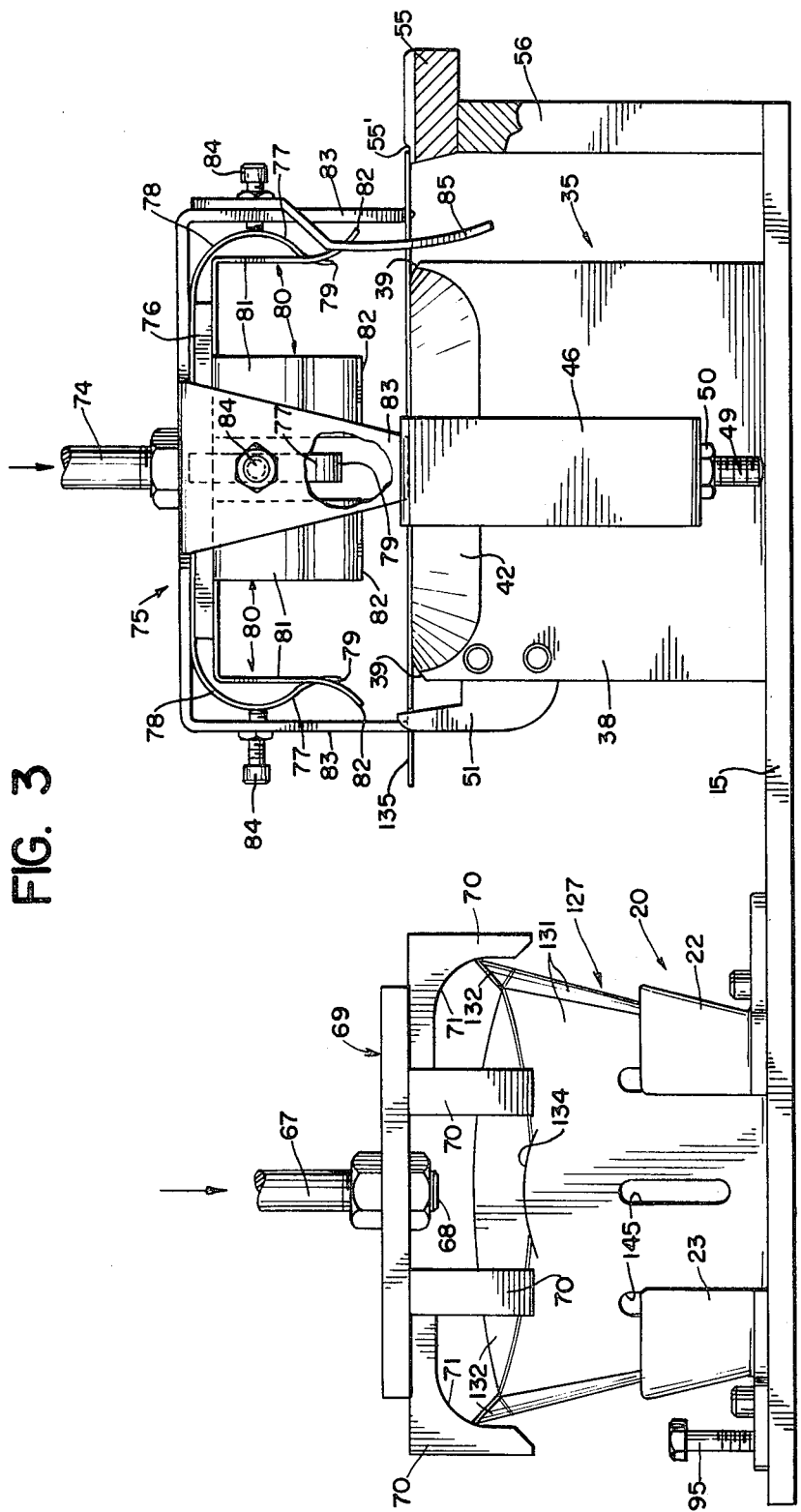

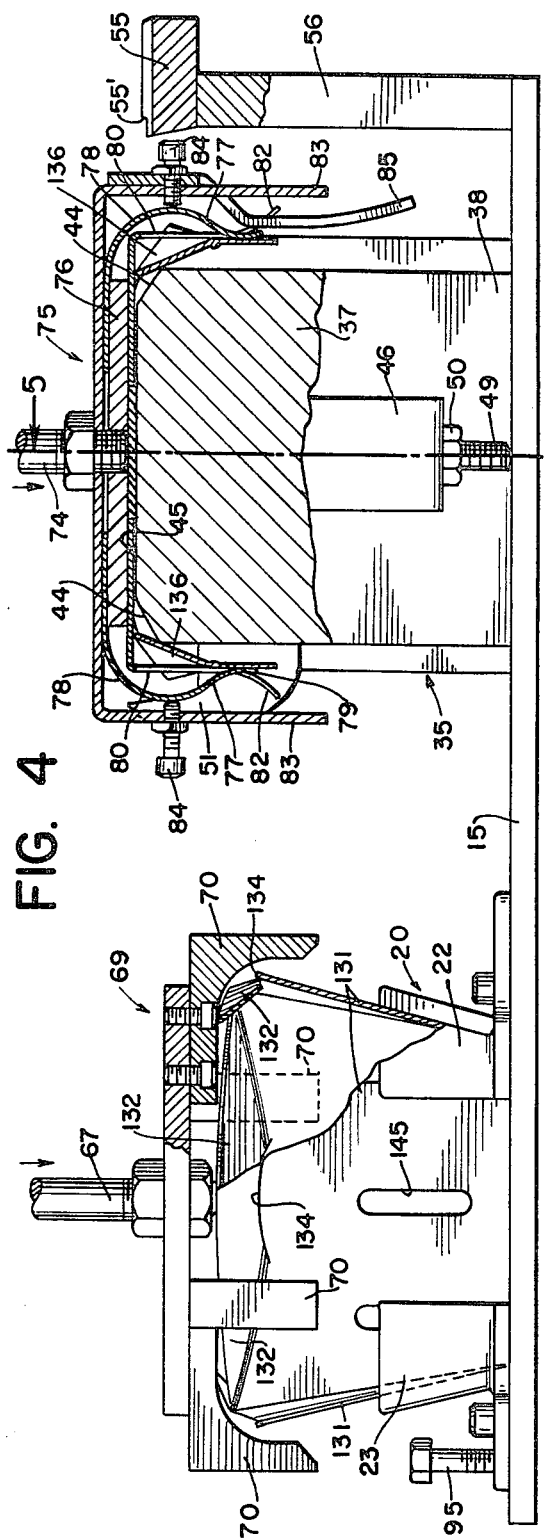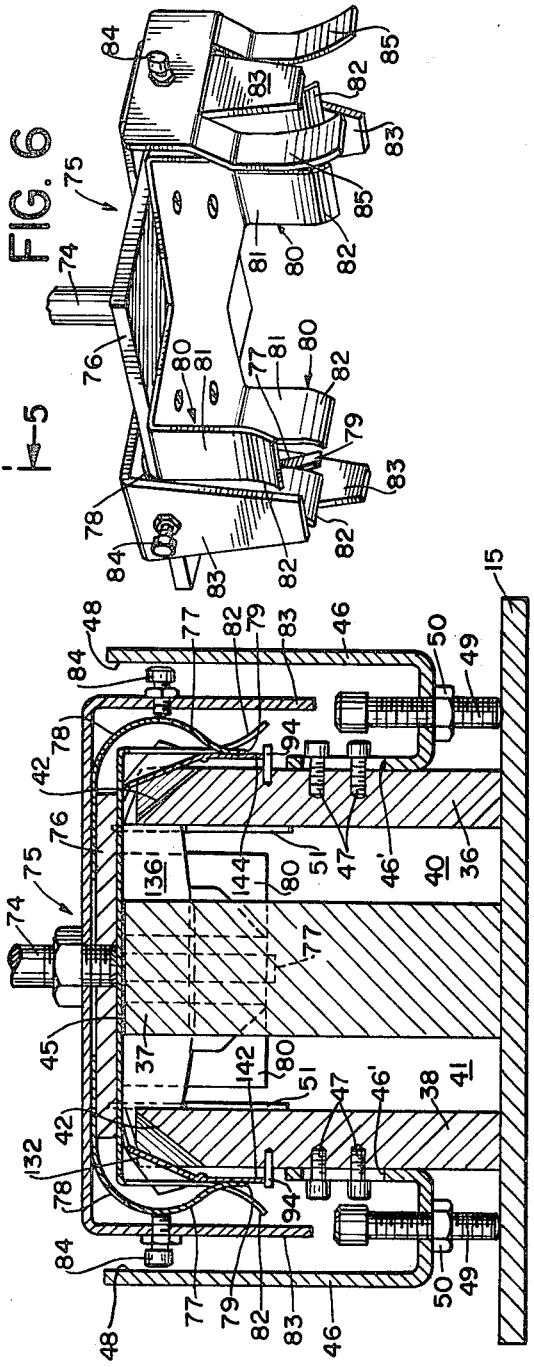

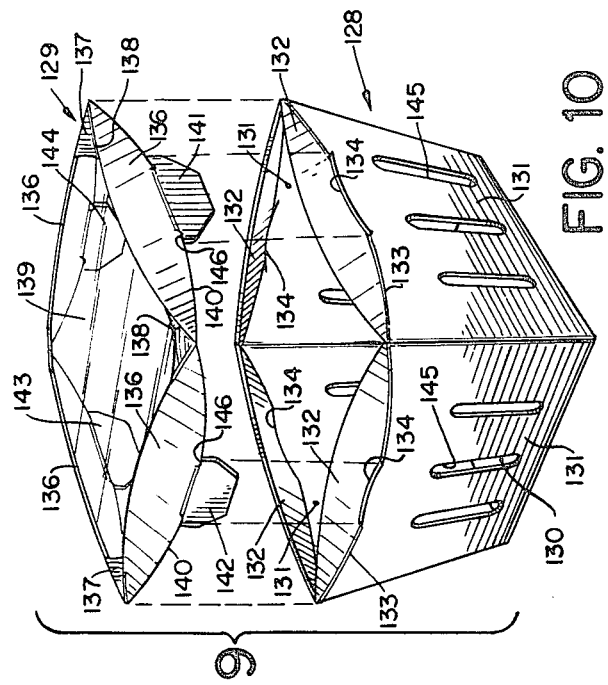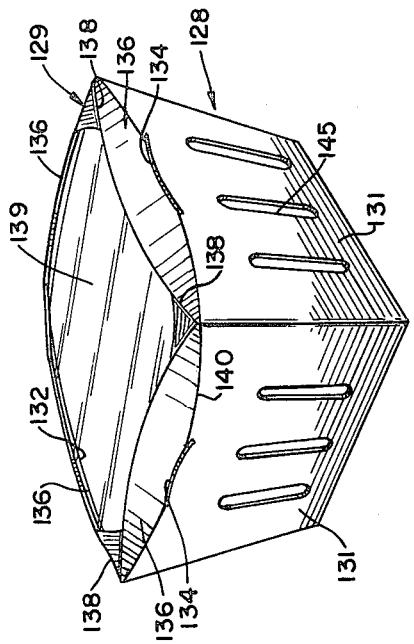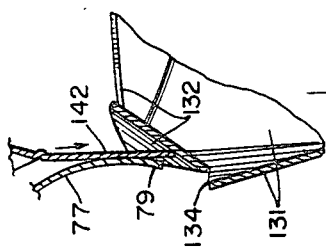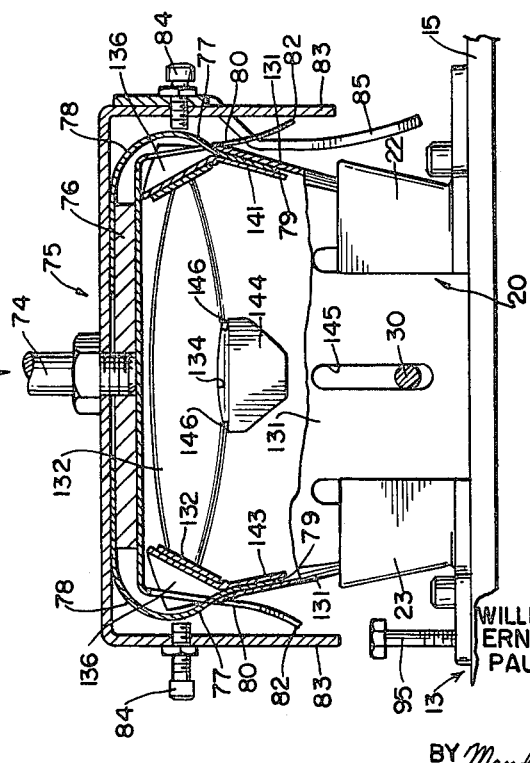

United States Patent Office 3,412,526
Patented Nov. 26, 1968

3,412,526
APPARATUS FOR PREFORMING AND
ASSEMBLING LIDS AND TRAYS
William H. Bennert, Ernest L. Bailey, and Paul A. Martin,
Atlanta, Ga., assignors to Riegel Paper Corporation,
New York, N.Y., a corporation of Delaware
Filed July 18, 1966, Ser. No. 566,014
19 Claims. (Cl. 53—289)

The present invention relates to packaging machinery and, more particularly, to new and improved apparatus for preshaping domed or so-called bulging paperboard lid members and tray members and then assembling the same. The apparatus of the invention is of particular advantage in the packaging of berries, fruit and the like in dome covered paperboard cartons of the type disclosed in detail in copending application Ser. No. 520,684, now Patent No. 3,343,660, filed January 14, 1966 of Ernest L. Bailey for "Box Closure."

The new packaging machinery enables a packager to attach lids, having a domed or bulging shape defined in part by a plurality of infolded elliptical panels, to mating trays, having bulging tops difined by similar infolded elliptical panels, in an automated fashion. The shaping and assembling of lids and trays is accomplished with precision, accuracy, and at rates heretofore unobtainable by hand assembly techniques.

In accordance with the principles of the invention, the lids are attached to the traps in a multi-step cycle in which the elliptically shaped panels of the tray and the lid are first preshaped into the desired domed or bulging configuration and are thereafter matingly attached.

The machine of the invention includes a series of stations at which the lid and tray elements are sequentially subjected to various package forming steps. More specifically, the new and improved apparatus includes a tray shaping station, a lid forming and attaching station, and a lid blank supplying station, all of which are in line and fixed on a machine frame in equally spaced relation. A slidable carriage is mounted on the frame for longitudinal movement relative to and beneath the fixed stations. In accordance with the invention, the carriage mounts a tray holder, a lid forming mandrel, and a lid feeding finger which selectively cooperate with specially designed reciprocating head members, included at the tray shaping and lid forming and attaching stations, and the lid bank supplying station to feed lid blanks to the mandrel, to preshape the lid blanks into lids, to preshape trays, and to attach the shaped lids to the shaped trays.

To understand more completely the principles of the invention and its attendant advantages, reference should be made to the following detailed description taken in conjunction with the accompanying drawings, in which:

FIG. 3 is a side elevational view of the carriage of the new machine with the forming heads initially engaging the upper edges of a tray and a flat lid blank;

FIG. 4 is a partial cross-sectional view of the apparatus of FIG. 3 with the forming heads fully engaged with a tray and a lid blank;

FIG. 5 is a cross-sectional view of the lid forming mandrel and the lid forming head taken along line 5—5 of FIG. 4;

FIG. 6 is a perspective view of the lid shaping and assembling head;

FIG. 7 is an enlarged, fragmentary, cross-sectional view showing insertion of a locking tab of a lid into a locking slit of a tray;

FIG. 8 is a cross-sectional view showing assembly of a shaped lid with a preshaped tray;

FIG. 9 is an exploded view of a lid and a tray which have been shaped and are to be assembled; and FIG. 10 is a completed assembly of a lid and a tray forming a bulging or domed paperboard carton.

Figure 1:
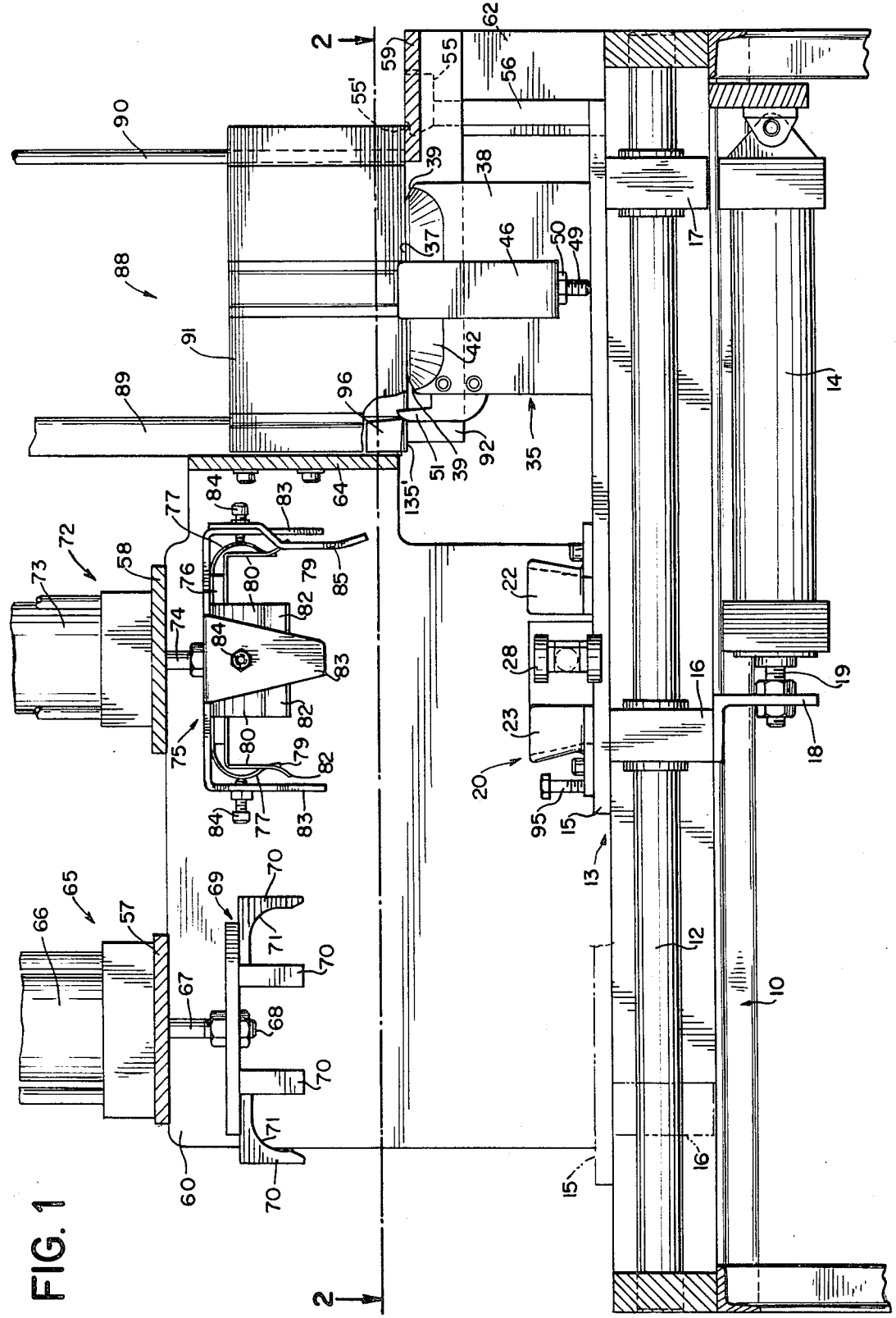
FIG. 1 is a cross-sectional view of the new apparatus embodying the principles of the invention.

In order to fully appreciate the new and improved apparatus of the invention, it is first necessary to understand the nature of the berry box or the like which is to be assembled thereby. As shown best in FIGS. 9 and 10, a representative berry box comprises a tray 128 to which a bulging or domed lid 129 is lockingly attached. More specifically, the tray 128 includes a base 130 and four side walls 131 flaring upwardly and outwardly therefrom. Each of the side walls has an elliptical support panel 132 articulated thereto along an arcuate score line 133 which is interrupted by a curved locking slit 134 at its central portions. To form a so-called bulging top, to receive and support the lid 129, and to open the locking slits 134, it is necessary that the elliptical support panels 132 be infolded as shown in FIGS. 9 and 10. As will be understood from the following description, the machine of the invention receives an erected but unshaped tray 127 (i.e., one in which the walls are upstanding and the support panels have not been infolded from the planes of the walls as shown in FIG. 3), infolds the support panels from the planes of the walls to shape the tray, and shapes and then attaches the domed lid 129 to the shaped tray 128.

The lid 129 is initially in the form of a flat blank 135 which includes four elliptical cover panels 136 linked by web portions 137 along arcuate score lines 138 and which has a transparent, plastic covered window 139 defined at its central portions. Additionally, the free edges 140 of the elliptical cover panels carry wedge-shaped locking tabs 141–144. As indicated in FIGS. 9 and 10, before assembly of the lid 129 with the tray 128, the elliptical cover panels 136 are obliquely infolded with respect to the generally flat window 139 to give the lid a domed configuration, and the locking tabs 141–144 are folded into a generally vertical position for insertion into the locking slits 134 of the tray.

It will be appreciated that certain variations in the design of the trays and the lids may be desirable or necessary for a given packaging application. However, for purposes of illustration only, the new and improved apparatus will be described in conjunction with the above-described tray 128 and lid 129, it being understood that the inventive principles apply equally to any tray and lid combination of the above-described type. For a more detailed description of trays and lids of this type, reference should be made to copending application Ser. No. 520,684, now Patent No. 3,343,660, for "Box Closure," filed on Jan. 14, 1966 by E. L. Bailey.

As will be understood, the apparatus of the invention automatically effects all of the aforementioned folding operations and, upon their completion, attaches the lid 129 to the tray 128 by placing it thereover and inserting the locking tabs 141–144 into the locking slits 134.

Figure 2:
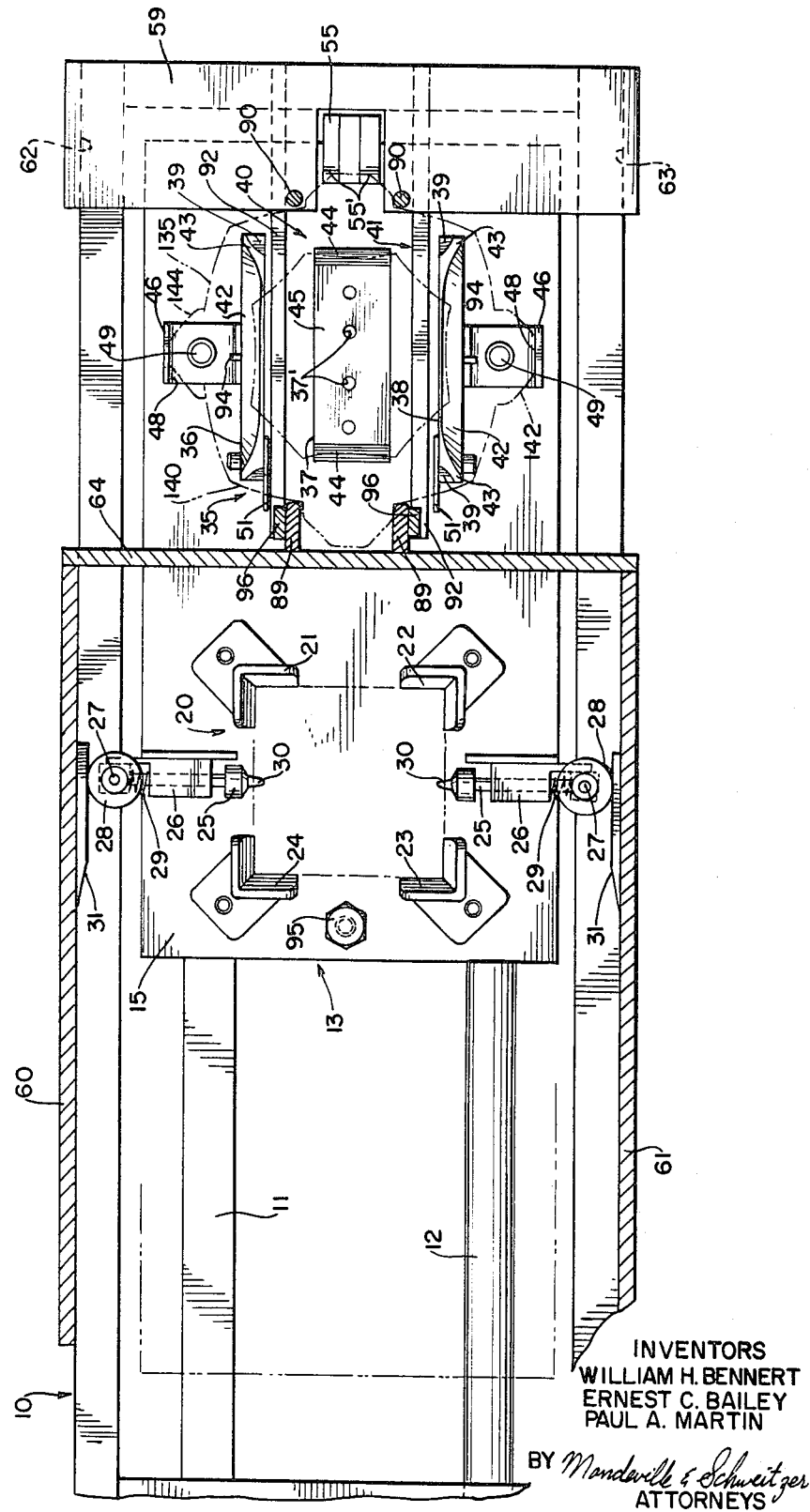
FIG. 2 is a cross-sectional view of the new apparatus taken along line 2—2 of FIG. 1.

Referring now to FIGS. 1 and 2, the apparatus of the new invention is mounted on a machine frame 10 which supports longitudinally extending guide tracks 11, 12, along which a carriage 13 is selectively displaced by a pneumatic linear actuator 14. The carriage 13 includes a flat base plate 15 which is supported on brackets 16, 17, which themselves are supported by the tracks 11, 12 for sliding displacement therealong. To that end, the bracket 16 includes an extension 18, which is directly connected to the free end of a reciprocable piston 19 included with the actuator 14.

On the forward end of the base plate (for convenience of description the lefthand side of the frame 10 will be designated as the forward end and the righthand side as the rearward end) a tray holder 20 is formed by four tray engaging elements 21–24 shaped similarly to the bottom corners of the trays 128 to which the domed covers 129 are to be attached. As shown in FIGS. 9 and 10, the tray side walls are generally convergently tapered toward the bottom; thus the elements 21–24 flare outwardly from the base plate 15.

Disposed intermediately of the tray engaging elements at the sides of the base plate are spring-loaded holding pins 25, which are slidably mounted in brackets 26. As shown, the outer ends of the pins 25 mount axles 27 about which roller cam followers 28 are freely rotatable. Biasing springs 29 act between the brackets 26 and the axles 27 to urge the free ends 30 of the pins 25 into a non-locking position without the tray outline defined by the elements 21–24. However, when the cam followers engage cam plates 31, as will be described in more detail hereinafter, they are cammed inwardly to a tray locking position within the tray outline, as shown in FIG. 2.

Toward the rearward end of the base plate 15 a lid shaping mandrel 35 is mounted. The mandrel 35 includes three longitudinally extending fold blocks 36, 37, 38 having beveled upper edges 39 generally corresponding to the shape of a finished lid. As shown clearly in FIG. 5, the fold blocks are arranged to define two longitudinal openings 40, 41 therebetween. More specifically, as shown in FIG. 2, the outer fold blocks 36, 38 have contoured elliptical lid panel supporting surfaces 42 and web supporting surfaces 43, while the intermediate block has appropriately contoured lid panel supporting surfaces 44 and a flat window supporting surface 45. As shown in FIG. 5, the upper surfaces of the intermediate fold block 37 are slightly higher than those of the outer fold blocks 36, 38. Moreover, as shown in FIG. 2, suction holes 37' are included in the block 37 in order to apply a vacuum to the underside of a lid blank as will be described in detail hereinafter.

Each of the outer fold blocks 36, 38 has generally J-shaped support wings 46 adjustably fastened thereto by studs 47 which pass through elongated slots 46' formed in the wings. The inner faces 48 of the wings are adapted to engage and to align the lateral edges of the locking tabs 142, 144 of the flat lid blank 135 with respect to the mandrel before folding. As shown, stop screws 49 are threaded into tapped holes formed in the lowermost portions of the wings 46. The heads of the screws 49 may be positioned to limit the descent of the forming head 72, to be described in more detail hereinbelow. Locking of the screws 49 in a precisely adjusted position is obtained through the use of lock nuts 50, as shown in FIG. 5.

Extending forwardly from the outer blocks 36, 38 are lid blank guides 51, against which the edges 140 of a lid blank 135 may be properly aligned with the contoured surfaces of the lid forming blocks of the mandrel, as will be described in greater detail hereinbelow. Additionally, stop pins 94 project outwardly of the mandrel blocks 36, 38 to limit the downward displacement of the lid tabs 142, 144 during formation, as shown in FIG. 5.

At the rearmost edge of the base plate 15 is a lid blank feeding finger 55 mounted on a post 56. The feeding finger, itself, includes a stepped lid engaging front surface 55' having a depth approximately equal to the caliper of the paperboard lid blanks.

In accordance with the invention, the machine frame 10 mounts three horizontal platforms 57, 58, 59 above and in planes parallel with that of the base plate 15. As shown in FIGS. 1 and 2, the platforms 57, 58, 59 are supported transversely of the machine frame through walls 60, 61, 62, 63. The walls 60, 61 are braced by a vertically disposed plate 64 which terminates at the plane of the rear platform which is slightly above the plane of the upper surfaces 45 of the forming mandrel 35.

As an important aspect of the invention, the forward platform 57 supports a tray shaping station 65 which includes a pneumatic actuator 66 having a reciprocable piston 67, the threaded free end 68 of which mounts a tray shaping head 69. The head 69 includes eight shaping fingers 70 having arcuate inner surfaces 71 which prebreak and infold the elliptical support panels 132 of the tray 128 upon downwardly directed camming engagement therewith, as will be understood.

A lid shaping and attaching station 72 is mounted on the intermediate platform 58 and includes a pneumatic actuator 73 having a reciprocating piston 74 extending downwardly therethrough. In accordance with the invention, the piston 74 is in line with and spaced from the piston 67 a distance equal to the center-to-center spacing of the tray holder 20 and the lid forming mandrel 35. As will be appreciated, this enables the pistons 67, 74 to be simultaneously actuated when the tray holder 20 and the mandrel 35 are aligned beneath the tray shaping and lid shaping stations 65, 72, respectively. A specially designed lid forming and attaching head 75 is carried by the piston 74.

As shown best in FIGS. 1 and 6, the forming and attaching head 75 includes a flat top wall 76 from which four relatively narrow lid retaining springs 77 depend. As shown, the lid retaining springs 77 have arcuately shaped body portions 78 and free end portions 79, which are generally parallel to the planes of the tray side walls 131 and thus are sloped slightly inwardly (FIG. 8), pairs of opposed lid retaining fingers being somewhat convergent. Straddling each of the lid retaining springs 77 are lid shaping springs 80 which have generally straight, depending body portions 81 which merge with outwardly curved end portions 82 at regions generally coincident with the termini of the lid retaining springs, as shown in FIG. 3.

Depending from the top wall 76 of the lid shaping head are tab depressing arms 83 which are shown in FIGS. 3 and 8, and extend below the terminal portions 79 of the lid retaining fingers. As an important aspect of the invention, adjustable screws 84 are carried by each of the depressing arms adjacent the curved portions 78 of the leaf spring retaining fingers. The precise positioning of the fingers may be had through adjustments of the screws 84 which bear against the spring fingers precisely controlling their deflection.

As shown in FIGS. 3 and 6, the rearwardly disposed tab depressing arm mounts a straddling pair of squaring arms 85 which extend below the bottom edges of the tab depressing arms. The precise geometry of the elements of the lip shaping and attaching head 75 as well as other elements of the apparatus are, of course, related to the shape of the flat lid blank 135 and the desired, domed configuration of the lid 129 and, therefore, may be subject to certain variation. However, the important operating interrelationship of the various elements of the apparatus will be the same for all trays and lids of the general type described.

A lid supplying station or lid blank magazine 88 is formed adjacent to the lid shaping station 72. As shown in FIGS. 1 and 2, the centerline-to-centerline spacing of the magazine 88 from the lid shaping station 72 is identical with that of the center-to-center spacing of the lid shaping station 72 and tray shaping station 65. Specifically, the magazine 88 includes forward rails 89 screwed to the plate 64 and rearward rails 90 mounted on the platform 59. As shown, the rails engage the lateral edges of a stack 91 of lid blanks 135 adjacent opposite locking tabs 141, 145. A pair of spaced stack support bars 92 extend forwardly from the platform 59, the location and spacing of the bars 92 being such that the mandrel 35 may mesh with the bars and pass directly and immediately beneath the lowermost blank in the stack 91, as shown in FIGS. 1 and 2. Caliper fingers 96 are adjustably mounted on the lower ends of the rails 89 and are spaced from the surfaces of the support bars 92 a distance greater than the caliper of a single blank but less than the caliper of two blanks (approximately 1.5 times the caliper of the paperboard from which the blanks are formed).

The new apparatus is designed to operate in a step-by-step timed sequence. Reciprocations of the pneumatically actuated pistons 19, 67, 74 to effect the various steps of the machine cycle in a predetermined, timed sequence may be controlled by a simple system of cams operated by an electric motor (not shown); however, it will be appreciated that any system of timingly reciprocating the actuators 14, 66, 73 may be employed.

For purposes of clear description, the operating sequence or machine cycle may be considered to start with the carriage 13 in its forward position (outlined in phantom in FIGS. 1 and 2). In this position the mandrel 35 is directly beneath the lid shaping and attaching station 72 and the tray holder 20 is directly beneath the tray shaping station 65 (FIG. 3).

In this first step of the sequence, a lid blank 135 rests on the mandrel, being engaged at its forward lateral edges 140 by the guides 51 and at the rearward lateral edge of the locking tab 103 by the lid feeding finger 55. The lateral edges of the locking tabs 142, 144 are engaged by the inner surfaces 48 of the wings 46. With the base plate 15 in its forward position, a filled tray 127 having unfolded or unshaped support panels 132 is placed therein automatically by a feeding device (not shown) or manually by an operator.

In the second step of the sequence both the lid shaping and tray shaping heads 69, 75 descend with the actuated pistons 67, 74 into contact with the lid blank and the tray. As the tray shaping head 69 moves from the partially descended position of FIG. 3 into the fully descended position of FIG. 4, the arcuate surfaces 71 of the tray shaping fingers 70 cam the elliptical support panels 132 inwardly about the arcuate score lines 133 thereby opening the locking slits 134. At the same time, the lid shaping and attaching head 75 moves from its partially descended position of FIG. 3 to its fully descended lid shaping position of FIG. 4. During the descent of the head 75 and in accordance with the inventive principles, the blank 135 is successively engaged by the squaring arms 85, tab depressing arms 83, and lid forming and retaining springs 77, 80, causing the lid panels 136 to be first squared with and then infolded about the contoured mandrel surfaces into its desired bulging shape with the locking flaps 141–144 depending downwardly therefrom (the lid configuration shown in FIG. 9). At this point in the machine cycle, the formed lid 129 is held at the edges of its elliptical panels 136 by the shaping springs 80, while the locking tabs 141–144 are maintained in their substantially vertically depending relation by the retaining springs 77.

The third step of the forming and attaching sequence involves the reciprocation of the heads 69, 75 into positions above the mandrel 35 and tray holder 20. In accordance with the invention, the formed lid 129 will be lifted from the mandrel and carried by the lip shaping and attaching head 75 while the tray will remain in the holder 20.

Thereafter and as the fourth step in the sequence, the carriage 13 is moved by the actuator 14 into the rearward position (FIGS. 1 and 8) in which the tray holder 20 carrying a filled, preshaped tray 128 is located directly under the lid shaping and attaching head 75 (which now is carrying a preshaped, domed lid) and the now empty mandrel 35 is disposed directly under the lid blank magazine 88. In accordance with the invention, as the carriage 13 slides from its forward to rearward positions, the locking pins 25 will be cammmed inwardly by the cam plates 31 into a tray engaging, locking relation (FIGS. 2 and 8) in which the pins project into the tray 128 through the openings 145 formed in the walls 131. As will be understood, the projected pins 25 prevent the tray from being lifted out of the tray holder 20 when the carriage is in its rearward position.

In the next and fifth step, the lid forming and attaching head 75 redescends, in a stroke somewhat greater than its stroke in the second step, and places the dome shaped lid 129 upon the preshaped tray 128, as shown in FIG. 8. More specifically, the lid retaining spring fingers 77 will guide the locking tabs 141–144 into the opened locking slits 134 and as the head 75 descends to the position of FIG. 8, the locking tabs will slide downwardly and inwardly along the sloped walls 131 of the tray 128 and into locked engagement with the elliptical support panels 132 defining the locking slits 134, in which the shoulder portions 146 of the tabs 141–144 underlie and are securely locked by the panels 132. It will be appreciated that at this point in the operation of the apparatus, the lid is attached to the tray.

Thereafter, as the sixth step in the cycle, the lid forming and attaching head 75 is reciprocated to its starting position (FIG. 2). As an important aspect of the invention, the action of the locking pins 25 and the above-described nature of the locking of the tabs 141–144 in the locking slits 134 is more than adequate to overcome the force of the lid shaping and lid retaining spring fingers and thereby prevents the lid from being withdrawn from or otherwise disengaged from the tray by the grasp of the spring fingers 77, 80.

In the seventh and final step of the machine cycle, the carriage 13 is returned to its forward position by the actuator 14 and in its travel accommodates the locking pins 25 which are removed from the tray slots 145 under the influence of the springs 29.

During this last step and as a further aspect of the invention, the lowermost blank 135' of the stack 91 is withdrawn by the lid feeding finger 55. As will be understood, the stepped surface 55' engages the blank 135' and sweeps it from the magazine 88 and onto the mandrel 35 against the guides 51 as the carriage 13 is displaced from its rearward to forward position. The withdrawn lid blank is held securely on the mandrel 35 through vacuum applied at the suction holes 37' and is also engaged at its lateral edges by the inner faces 48 of the wings 46 in predetermined alignment. However, in the event that the blank is swept into less than perfectly square alignment with the mandrel, the squaring arms 85 of the shaping head 75 will engage the rear edges of the lid blank and urge the blank against the guides 51 before the other shaping elements contact the lid and fold the elliptical panels 136 about the contoured mandrel surfaces.

The controlled gaps between the caliper fingers 96 and the support rails 92 prevent the feeding of more than one blank at a time, as should be understood. Furthermore, the greater height of the intermediate block 37 in comparison with the outer blocks 36, 38 tends to maintain the window portions 139 of the lid blank (which are normally of smaller caliper than paperboard) at least in the same plane as the other portions of the lid blank. This arrangement prevents jamming of blanks during feeding. Of course, where lid blanks are of uniform caliper throughout, the mandrel blocks 36–38 may all be of uniform height.

As will be understood, the seventh step completes the machine cycle. The completed dome covered tray (FIG. 10) may be removed (automatically or manually) from the tray holder 20 and replaced by another filled, unshaped tray 127 to commence the next machine cycle.

As a safety arrangement for preventing bending or misalignment of the forming head in the event that the tray holder 20 is empty during the fifth step, the descending tab depressing arm 83 will engage a stop 95 disposed in line therewith and adjacent the tray holder 20 at the same instant the squaring arms 85 engage the base plate 15.

The foregoing sequence of operations of an in line machine has been described by way of example only, it being understood that variations in the sequence and the apparatus will suggest themselves to those skilled in the art. For example, the forming and attaching elements may readily be adapted to rotary types of machines where found necessary or desirable. Moreover, alternate lid blank feeding arrangements as well as any automatic tray feeding and removing arrangements may be incorporated with the apparatus of the invention. In whatever form it may assume, in line, rotary, or otherwise, it will be appreciated that the apparatus of the invention simply and efficiently effects the packaging of berries or any other commodity in a bulging carton comprising a shaped lid and shaped tray.

It should be understood that the specific apparatus herein illustrated and described is intended to be representative only, as certain changes may be made therein without departing from the clear teachings of the disclosure. Accordingly, reference should be made to the following appended claims in determining the full scope of the invention.

We claim:

1. Apparatus for shaping the upper edges of trays and lids and subsequently attaching shaped lids to shaped trays, comprising
   (a) machine frame means including a carriage bed;
   (b) a carriage means mounted on said bed for movement in a horizontal plane between predetermined first and second machine stations;
   (c) a tray shaping means mounted at said first station;
   (d) a lid handling means mounted at said second station;
   (e) tray holding means mounted on said carriage means;
   (f) lid forming mandrel means;
   (g) lid feeding means adjacent said lid forming mandrel means for depositing a flat lid thereupon;
   (h) means imparting relative reciprocative movement between said lid handling means and said lid forming mandrel means and relative reciprocative movement between said lid handling means and said tray holding means;
   (i) means imparting relative reciprocative movement between said tray shaping head and said tray holding means; and
   (j) means for moving said carriage from said first to said second stations.

2. Apparatus in accordance with claim 1, in which
   (a) said tray shaping means includes a plurality of shaping fingers having concave surfaces adapted to engage and to cam inwardly free edge portions of trays disposed in said tray holding means.

3. Apparatus in accordance with claim 1, in which
   (a) said tray holding means includes reciprocable tray engaging means selectively actuable into tray locking engagement when said tray holding means is in operative association with said second station.

4. Apparatus in accordance with claim 3, in which
   (a) said tray engaging means includes a locking pin;
   (b) a spring means normally urges said locking pin into a non-locking position;
   (c) said machine frame means includes cam plate means at said second station and cooperable with said locking pin to cam said pin into tray locking relation.

5. Apparatus in accordance with claim 1, in which
   (a) said bed includes longitudinally extending track means;
   (b) said lid forming mandrel is carried by said carriage;
   (c) said means imparting relative reciprocative movement between said lid handling means and said lid forming mandrel means and relative reciprocative movement between said lid handling means and said tray holding means comprises a single reciprocating arm having a predetermined stroke cycle;
   (d) said means for moving said carriage from said first to said second stations includes means reciprocating said carriage between said first and second stations.

6. Apparatus in accordance with claim 5, in which
   (a) a lid magazine is mounted at a third station in line with said first and second stations;
   (b) said mandrel means is positioned on said carriage to be automatically moved into operative association with said third station when said tray holding means is moved into operative association with said second station;
   (c) said lid feeding means includes a finger-like element carried by said carriage and adapted to cooperate with said magazine to urge a blank therefrom and onto said lid forming mandrel means when said mandrel means is in operative association with said third station.

7. Handling and shaping apparatus for domed lid blanks of the type including central cover portions, obliquely infolded panel portions articulated about the periphery of said central cover portions, and locking tab means associated with said panel portions, comprising
   (a) mandrel means having upper areas adapted to engage and support said central cover portions;
   (b) said upper areas generally conforming to the configuration of the central portions of said lid;
   (c) shaping head means mounted for reciprocating motion relative to said mandrel means;
   (d) lid panel engaging finger means carried by said shaping head adapted to engage and to bend a flat lid blank about said mandrel and into predetermined domed shape upon a first relative movement of said mandrel means and said finger means;
   (e) locking tab engaging finger means carried by said shaping head and adapted to engage and to bend said locking tab means upon said first relative movement of said mandrel means and said locking tab engaging finger means;
   (f) said finger means retaining said predetermined domed shape of said lids upon reversal of said first relative movement.

8. The apparatus of claim 7, in which
   (a) said mandrel means includes beveled edge portions generally conforming to said predetermined domed shape.

9. The apparatus of claim 7, in which
   (a) said finger means are resilient, leaf springlike elements.

10. The apparatus of claim 7, in which
    (a) lid blank guide means are mounted in association with said mandrel means;
    (b) lid blank squaring arms are carried by said shaping head;
    (c) said arms extending beyond said finger means and being adapted to engage a flat lid blank on said mandrel means in advance of the engagement of said finger means to align said blank with said guide means.

11. The apparatus of claim 10, in which
    (a) locking tab depressing arms are mounted on said shaping head and are of sufficient length to engage a lid blank in advance of said locking tab engaging finger means;
    (b) screw means are carried by said locking tab depressing arms;
    (c) said screw means are selectively engageable with said locking tab engaging fingers to adjust the same.

12. A blank feeding mechanism comprising
    (a) a mandrel means mounted on a movable carriage;
    (b) blank magazine means including at least one supporting post having an upper planar surface upon which a stack of blanks may be supported;
    (c) said mandrel means defining an opening therein of sufficient size to accommodate movement of said mandrel into meshing relation with said supporting post;

(d) blank feeding finger means fixedly mounted on said carriage adjacent said mandrel means and in the plane of said upper planar surface;

(e) whereby upon movement of said mandrel out of meshing relation with said supporting post said feeding finger will sweep through the plane of said support surface.

13. A blank feeding mechanism in accordance with claim 12, in which (a) stack aligning and retaining rails are included in said magazine means and have their lowermost ends disposed above said mandrel means and said supporting post;

(b) caliper finger means mounted on lower portions of the forwardmost of said rails and defining a predetermined gap with said supporting post;

(c) said gap being greater than the caliper of a blank to be fed but less than twice the caliper of said blank;

(d) said mandrel means including vacuum ports.

14. Handling and shaping apparatus for erecting and attaching domed lids to bulging type trays, wherein the upper edge portions of the trays and the outer edge portions of the lids are formed by arcuate panels, comprising (a) means for folding downward and inward the arcuate panels of a flat lid blank;

(b) means for folding inward the arcuate panels of an erected tray;

(c) said lid blank having locking tabs projecting outward from the arcuate panels thereof, and said apparatus including means cooperating with the means of subparagraph (a) for folding and retaining said locking tabs in a vertically downward direction; and (d) said tray having locking slits formed adjacent the bottom edges of the arcuate panels thereof, and said apparatus including means for applying the folded lid downward onto the folded tray, whereby said locking tabs enter and become engaged in said locking slits.

15. The apparatus of claim 14, further characterized by (a) said means for folding the arcuate panels of the lid and tray being arranged and disposed to fold said panels through an angle substantially less than 90°; and (b) said means for folding and retaining said locking tabs being disposed and arranged to fold said tabs through an angle of about 90° or more, whereby the lower end extremities of said tabs are engaged by the inclined surfaces of the folded tray panels and guided thereby into said locking slits.

16. Handling and shaping apparatus for erecting and attaching domed lids to bulging type trays, wherein the upper edge portions of the trays and the outer edge portions of the lids are formed by arcuate panels, comprising (a) means for folding downward and inward the arcuate panels of a flat lid blank;

(b) said means for folding including lid retaining means;

(c) means for effecting relative closing movement between an erected tray and a folded lid retained in said means for folding;

(d) said lid blanks having locking tabs projecting outward from the arcuate panels thereof, and said apparatus including means cooperating with the means of subparagraph (a) for folding and retaining said locking tabs in a vertically downward direction; and (e) said tray having locking slits disposed for engagement with said locking tabs and guide panels associated with said slits, and said apparatus including means for folding the guide panels into an upwardly inclined position, whereby said locking tabs engage and are guided by said guide panels into said locking slits upon closing movement of said lid and tray.

17. The apparatus of claim 16, further characterized by (a) said means for effecting relative closing movement comprising means for reciprocating said lid folding and retaining means; and (b) means being provided for effecting alternate alignment opposite the reciprocating folding and retaining means of a lid forming mandrel and an erected tray.

18. Apparatus for preforming and assembling lids and trays, comprising (a) mandrel means having contoured elements generally definitive of a predetermined domed configuration;

(b) blank feeding means for presenting a flat lid blank to said mandrel means;

(c) lid shaping and handling means for folding said flat lid blank about said contoured elements into a preshaped, domed lid and for removing the preshaped lid from said mandrel means;

(d) tray holding means for maintaining a tray in a predetermined position;

(e) tray shaping means for preforming the uppermost portions of a tray into predetermined bulging, lid receiving condition;

(f) means for effecting sufficient relative movement between said lid shaping and handling means and said tray holding means to place a preformed lid carried by the former in closing relation with a preformed tray supported by the latter.

19. Apparatus in accordance with claim 18, in which (a) said means for effecting relative movement between said lid shaping and handling means and said tray holding means includes a horizontally displaceable carriage mounting said tray holding means and a vertically reciprocable actuator mounting said lid shaping and handling means.

References Cited
UNITED STATES PATENTS 2,774,204   12/1956   Bowman _____ 53—289 X
3,335,541   8/1967    Mumma et al. _____ 53—290 X TRAVIS S. McGEHEE, *Primary Examiner.*

R. L. FARRIS, *Assistant Examiner.*